United States Patent
Zhou

(10) Patent No.: US 11,223,868 B2
(45) Date of Patent: Jan. 11, 2022

(54) PROMOTION CONTENT PUSH METHOD AND APPARATUS, AND STORAGE MEDIUM

(71) Applicant: TENCENT TECHNOLOGY (SHENZHEN) COMPANY LIMITED, Guangdong (CN)

(72) Inventor: Bin Zhou, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/943,005

(22) Filed: Jul. 30, 2020

(65) Prior Publication Data

US 2020/0359073 A1 Nov. 12, 2020

Related U.S. Application Data

(63) Continuation of application No. PCT/CN2019/079268, filed on Mar. 22, 2019.

(30) Foreign Application Priority Data

Apr. 10, 2018 (CN) .......................... 201810314964.1

(51) Int. Cl.
*H04N 21/235* (2011.01)
*H04N 21/254* (2011.01)
(Continued)

(52) U.S. Cl.
CPC ......... *H04N 21/262* (2013.01); *G06F 16/735* (2019.01); *G06F 16/7834* (2019.01);
(Continued)

(58) Field of Classification Search
CPC .......................... H04N 21/2668; H04N 21/4532
See application file for complete search history.

(56) References Cited

U.S. PATENT DOCUMENTS

2010/0042504 A1\* 2/2010 Shenfield ............... G06Q 30/02
 705/14.73
2010/0145808 A1 6/2010 Hilbert et al.
(Continued)

FOREIGN PATENT DOCUMENTS

CN 101075892 A 11/2007
CN 103200262 A 7/2013
(Continued)

OTHER PUBLICATIONS

International search report for PCT/CN2019/079268 dated Jun. 26, 2019.
(Continued)

*Primary Examiner* — Hsiungfei Peng
(74) *Attorney, Agent, or Firm* — Sughrue Mion, PLLC

(57) ABSTRACT

Provided is a promotion content push method performed by a promotion content delivery platform. A video promotion content material uploaded by a promotion client is received, and an order of a promotion content is generated according to the video promotion content material, first targeting information, and second targeting information. In response to a video promotion content push request, including a user identity, transmitted from an application client, a to-be-pushed order of the promotion content is determined, and first targeting information related to a video promotion content material of the to-be-pushed order and second targeting information related to an audio material of the to-be-pushed order match the user identity. A link address of a to-be-pushed image material and a link address of the audio material of the to-be-pushed order are transmitted to the application client.

18 Claims, 7 Drawing Sheets

(51) Int. Cl.
*H04N 21/258* (2011.01)
*H04N 21/266* (2011.01)
*H04N 21/433* (2011.01)
*H04L 12/18* (2006.01)
*H04N 21/262* (2011.01)
*G06F 16/783* (2019.01)
*G06F 16/735* (2019.01)
*H04N 21/2668* (2011.01)
*H04N 21/439* (2011.01)
*H04N 21/44* (2011.01)
*H04N 21/45* (2011.01)
*H04N 21/81* (2011.01)
*H04N 21/858* (2011.01)

(52) U.S. Cl.
CPC ....... *H04N 21/235* (2013.01); *H04N 21/2668* (2013.01); *H04N 21/439* (2013.01); *H04N 21/44* (2013.01); *H04N 21/4532* (2013.01); *H04N 21/812* (2013.01); *H04N 21/8126* (2013.01); *H04N 21/8586* (2013.01)

(56) References Cited

U.S. PATENT DOCUMENTS

| | | | | |
|---|---|---|---|---|
| 2012/0030704 | A1* | 2/2012 | Schiller | H04N 21/25891 725/34 |
| 2012/0131626 | A1* | 5/2012 | Fernandez | H04N 21/812 725/109 |
| 2013/0144716 | A1* | 6/2013 | Xiong | H04N 21/25808 705/14.52 |
| 2017/0004543 | A1* | 1/2017 | Bhamidipati | G06Q 30/0242 |
| 2019/0191205 | A1* | 6/2019 | DeLorme | H04N 21/4122 |

FOREIGN PATENT DOCUMENTS

| | | |
|---|---|---|
| CN | 103747302 A | 4/2014 |
| CN | 105025319 A | 11/2015 |
| CN | 106326460 A | 1/2017 |

OTHER PUBLICATIONS

Written Opinion dated Jun. 26, 2019 from the International Searching Authority in International Application No. PCT/CN2019/079268.

* cited by examiner

(12) United States Patent

PROMOTION CONTENT PUSH METHOD AND APPARATUS, AND STORAGE MEDIUM

CROSS-REFERENCE TO RELATED APPLICATION(S)

This application is a bypass continuation application of International Application No. PCT/CN2019/079268, filed on Mar. 22, 2019, which claims priority to Chinese Patent Application No. 201810314964.1, entitled "PROMOTION CONTENT PUSH METHOD AND APPARATUS, AND STORAGE MEDIUM" filed with the China National Intellectual Property Administration on Apr. 10, 2018, the disclosures of which are herein incorporated by reference in their entireties.

FIELD

The disclosure relates to the field of Internet technologies, and in particular, to a promotion content push method and apparatus, and a storage medium.

BACKGROUND

With the development of Internet technologies, an increasing number of pieces of data including a text, a picture, an audio, and a video, etc. is pushed to various users through the Internet. For example, when a user uses a mobile phone, a personal computer (PC), and other terminal devices to browse a web, the user receives various pieces of data pushed by the network, such as an advertisement, public benefit publicity information, and news, etc. in a form of a picture or a video. In this way, the user may timely acquire news and interesting content, etc. Such data may be referred to as push information, promotion content, or a media-pushed content.

SUMMARY

In accordance with an example embodiment of the disclosure, provided is a promotion content push method, performed by a promotion content delivery platform, the method including: receiving a video promotion content material uploaded by a promotion client, the video promotion content material including an image material and an audio material; receiving, from the promotion client, first targeting information related to the video promotion content material and second targeting information related to the audio material; generating an order of a promotion content according to the video promotion content material, the first targeting information, and the second targeting information; in response to a video promotion content push request, including a user identity, transmitted from an application client, determining a to-be-pushed order of the promotion content, first targeting information related to a video promotion content material of the to-be-pushed order and second targeting information related to an audio material of the to-be-pushed order matching the user identity; and transmitting data of the to-be-pushed order to the application client, the data of the to-be-pushed order including a link address of a to-be-pushed image material and a link address of the audio material of the to-be-pushed order.

In accordance with an example embodiment of the disclosure, provided is a promotion content push method, performed by a terminal device, the method including: transmitting a video promotion content push request to a promotion content delivery platform, the video promotion content push request including a user identity; receiving information about video promotion content material from the promotion content delivery platform in response to the video promotion content push request, the information about the video promotion content material including a link address of an image material and a link address of an audio material, the video promotion content material corresponding to first targeting information, and the audio material corresponding to second targeting information, the first targeting information and the second targeting information matching the user identity; acquiring the image material based on the link address of the image material; acquiring the audio material based on the link address of the audio material; generating a video promotion content based on the image material and the audio material; and displaying the video promotion content.

In accordance with an example embodiment of the disclosure, provided is a promotion content push apparatus, including: at least one memory configured to store program code; and at least one processor configured to read the program code and operate as instructed by the program code, the program code including: receiving code configured to cause at least one of the at least one processor to: receive a video promotion content material uploaded by a promotion client, the video promotion content material including an image material and an audio material; and receive, from the promotion client, first targeting information related to the video promotion content material and second targeting information related to the audio material; generating code configured to cause at least one of the at least one processor to generate an order of a promotion content according to the video promotion content material, the first targeting information, and the second targeting information; determining code configured to cause at least one of the at least one processor to, in response to a video promotion content push request, including a user identity, transmitted from an application client, determine a to-be-pushed order of the promotion content, first targeting information related to a video promotion content material of the to-be-pushed order and second targeting information related to an audio material of the to-be-pushed order matching the user identity; and transmitting code configured to cause at least one of the at least one processor to transmit data of the to-be-pushed order to the application client, the data of the to-be-pushed order including a link address of a to-be-pushed image material and a link address of the audio material of the to-be-pushed order.

In accordance with an example embodiment of the disclosure, provided is a promotion content push method. The method includes: receiving a video promotion content material uploaded by a promotion client, the video promotion content material including an image material and an audio material; receiving first targeting information for the video promotion content material and second targeting information for the audio material set by the promotion client; generating an order according to the video promotion content material, the first targeting information, and the second targeting information; determining a to-be-pushed order according to a video promotion content push request that carries a user identity and is transmitted by an application client, the first targeting information and the second targeting information in the order matching the user identity; and transmitting data of the order to the application client, so that the application client displays the video promotion content, the data of the order including a link address of a to-bepushed image material and a link address of an audio material for which the second targeting information matching the user identity is set.

In accordance with an example embodiment of the disclosure, provided is a promotion content push method. The method includes: transmitting a video promotion content push request to a promotion content delivery platform, the video promotion content push request carrying at least a user identity; receiving information about a video promotion content material returned by the promotion content delivery platform according to the video promotion content push request, the information about the video promotion content material including a link address of an image material and a link address of an audio material, the video promotion content material corresponding to first targeting information, and the audio material corresponding to second targeting information, the first targeting information and the second targeting information matching the user identity; acquiring the image material according to the link address of the image material; acquiring the audio material according to the link address of the audio material; generating a video promotion content according to the image material and the audio material; and displaying the video promotion content.

In accordance with an example embodiment of the disclosure, provided is a promotion content push apparatus. The apparatus includes: a receiving module configured to receive a video promotion content material uploaded by a promotion client, the video promotion content material including an image material and an audio material, and receive first targeting information for the video promotion content material and second targeting information for the audio material that are set by the promotion client; a generating module configured to generate an order according to the video promotion content material, the first targeting information, and the second targeting information; a determining module configured to determine a to-be-pushed order according to a video promotion content push request transmitted by an application client, both the first targeting information and the second targeting information in the order matching a user identity; and a transmitting module configured to transmit data of the order to the application client, so that the application client displays the video promotion content, the data of the order including a link address of a to-be-pushed image material and a link address of a to-be-pushed audio material.

In accordance with an example embodiment of the disclosure, provided is a promotion content push apparatus. The apparatus includes: a transmitting module configured to transmit a video promotion content push request to a promotion content delivery platform, the video promotion content push request carrying at least a user identity; a receiving module configured to receive information about the video promotion content material returned by the promotion content delivery platform according to the video promotion content push request, the information about the video promotion content material including a link address of an image material and a link address of an audio material, the video promotion content material corresponding to first targeting information, and the audio material corresponding to second targeting information, the first targeting information and the second targeting information matching the user identity; an acquiring module configured to acquire the image material according to the link address of the image material, and acquire the audio material according to the link address of the audio material; a generating module configured to generate a video promotion content according to the image material and the audio material; and a display module configured to display the video promotion content.

In accordance with an example embodiment of the disclosure, provided is a promotion content push apparatus, including a processor and a memory, the memory storing a computer readable instruction capable of causing the processor to perform the foregoing method.

In accordance with an example embodiment of the disclosure, provided is a non-transitory storage medium storing a computer readable instruction executable by at least one processor to perform one or more of the foregoing methods.

BRIEF DESCRIPTION OF THE DRAWINGS

The above and other aspects, features, and advantages of certain example embodiments of the disclosure will be more apparent from the following description taken in conjunction with the accompanying drawings.

DETAILED DESCRIPTION

The technical solutions in the example embodiments of the disclosure will be clearly and completely described in the following with reference to the accompanying drawings in the example embodiments of the disclosure. It is obvious that the example embodiments to be described are only a part, rather than all, of the embodiments of the disclosure. All other embodiments obtained by a person of ordinary skill in the art based on the embodiments of the disclosure described herein without creative efforts shall fall within the protection scope of the disclosure.

Terms including ordinal numbers, such as "first," "second," etc., may be used to represent various elements, but do not limit the elements. The terms are only used for distinguishing one element from another element. For example, a first element may also be called a second element, and similarly, the second element may also be called the first element without departing from the scope of the present disclosure. As used herein, the term "and/or" includes any and all combinations of one or more of the associated listed items. Expressions such as "at least one of," when preceding a list of elements, modify the entire list of elements and do not modify the individual elements of the list.

In example embodiments of the disclosure, the term "video" may be interchangeably used as an image, a moving image, and/or a combination of an image and an audio.

Figure 1:
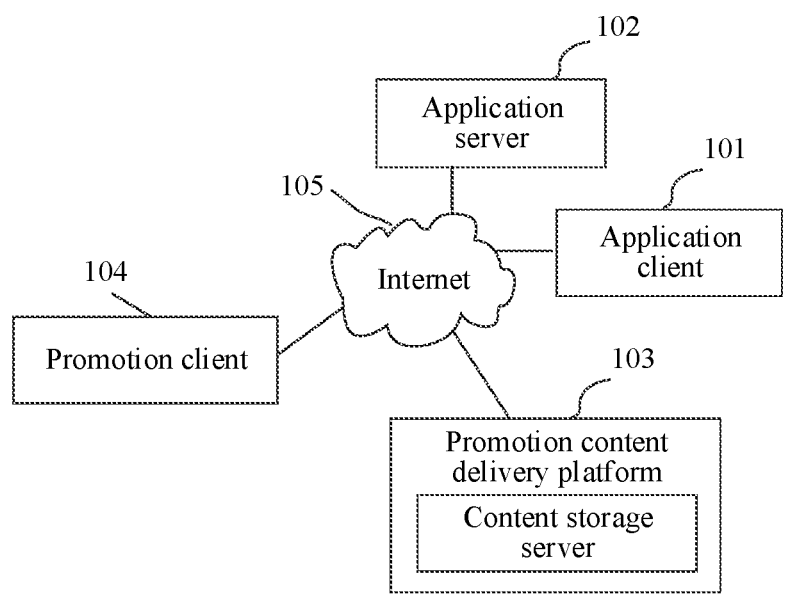
FIG. 1 is a schematic diagram of a system architecture according to an example embodiment of the disclosure.

The disclosure provides a promotion content push method applied to a system architecture, according to an example embodiment shown in FIG. 1. As shown in FIG. 1, the system architecture includes: an application client 101, an application server 102, a promotion content delivery platform 103, and a promotion client 104. The promotion content delivery platform 103 may include a content storage server. The application client 101, the application server 102, the promotion content delivery platform 103, and the promotion client 104 may be in communication with each other via Internet 105.

A promotion party may upload a video promotion content material through the promotion client 104. The video promotion content material may include an image material (or a video material) and an audio material. The promotion party may further set targeting information of the video promotion content material and the audio material through the promotion client 104, and cause the video promotion content material to correspond to first targeting information, and the audio material to correspond to second targeting information.

A user uses the application client 101 (such as a video APP) to access the application server 102, such as browsing a page or watching an online video, etc. The application server 102 may be a website server providing various Internet services, such as a portal website server, a server providing an online video/audio play service, and a social platform server, etc. In a case that a user uses the application client 101 to access media content (such as a video) in the application server 102, a software development kit (SDK), for example, an advertisement SDK, used for pushing the promotion content (such as an advertisement) in the application client 101 sends a video promotion content push request (such as an advertisement exposure request) to the promotion content delivery platform 103. In addition, the video promotion content push request carries at least a user identity. The promotion content delivery platform 103 performs selection from promotion contents (e.g., a menu of the promotion content) according to the user identity carried in the request and obtains, through selection, an order (e.g., order of the promotion content) to be exposed for the user. First targeting information corresponding to a video promotion content material in the order and second targeting information corresponding to an audio material in the order match the user identity. The promotion content delivery platform 103 carries data of the order in a video promotion content acquisition response (such as an advertisement exposure response) and sends the data to the application client 101. The data of the order may include a link address (URL) of an image material and a URL of the audio material. The application client 101 acquires the image material of a video and the audio material of the video from the content storage server according to the URL of the image material of the video and the URL of the audio material of the video, and generates a video promotion content according to the image material of the video and the audio material of the video and displays the video promotion content.

In a case that the promotion content is an advertisement, the system architecture shown in FIG. 1 may be a system architecture for implementing Internet advertisement delivery. The promotion content delivery platform 103 may be an advertisement delivery platform, and the promotion party may be an advertiser.

Figure 2:
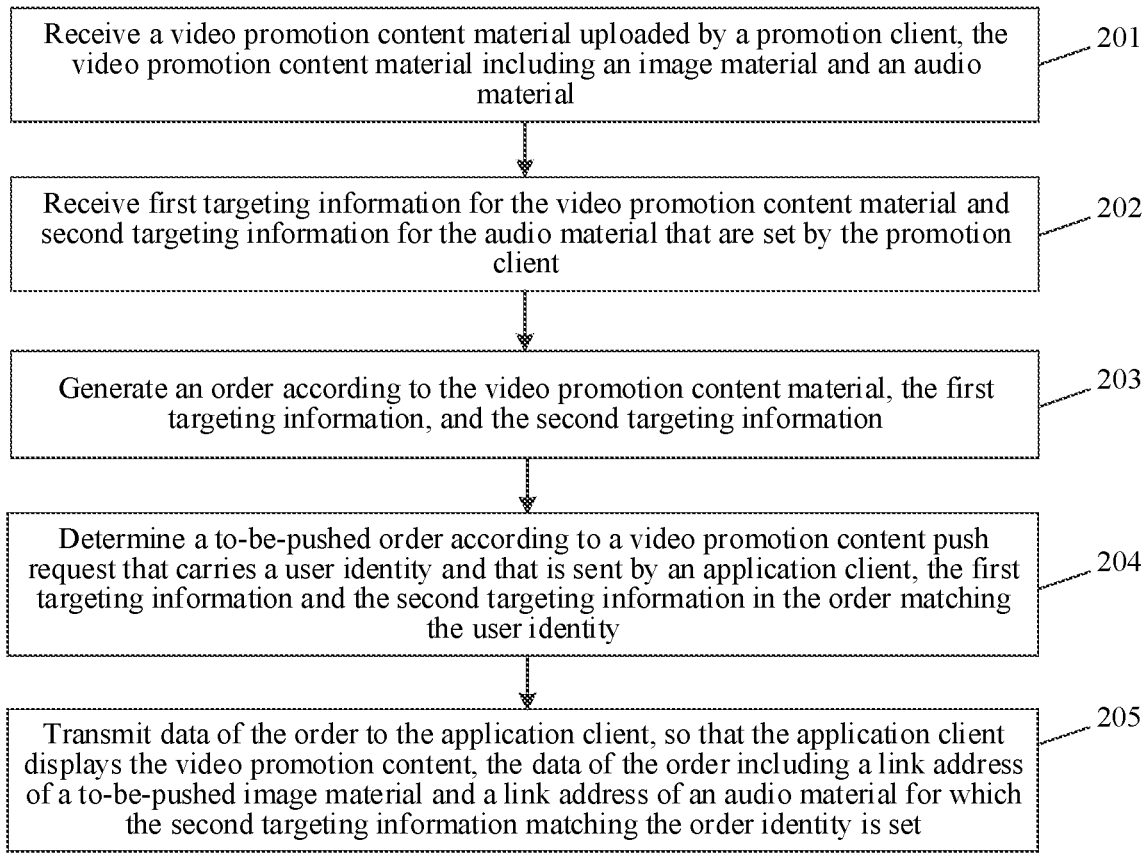
FIG. 2 is a flow chart of a method according to an example embodiment of the disclosure.

In an example, the promotion content push method provided in the example of the disclosure may be applied to the promotion content delivery platform 103. As shown in FIG. 2, the method includes the following operations 201-205.

Operation 201: Receive a video promotion content material uploaded by a promotion client, the video promotion content material including an image material and an audio material.

In some examples, the receiving a video promotion content material uploaded by a promotion client includes: receiving a promotion target parameter set by the promotion client, the promotion target parameter including a type of a promotion content; and in a case that the type of the promotion content based on the video promotion content material is a video (e.g., a video including an audio and an image), receiving the video promotion content material uploaded by the promotion client.

Herein, the promotion target parameter includes the type of the promotion content and user targeting, etc. The type of the promotion content may be a video, an audio, and a picture, etc. In a case that the promotion content is the video, for example, a pre-roll pre-video advertisement, a video focus map, and a video information stream advertisement, etc., the promotion party divides the promotion content material into an image material and an audio material through the promotion client, and the image material and the audio material may be combined into a video for display. The promotion party further configures a plurality of different audio materials for the same image material through the promotion client. The plurality of different audio materials are associated with the image material. The image material and any one of the audio materials may be combined to generate a video promotion content. Therefore, different video promotion contents may be achieved, and production costs for production of the video promotion content material are reduced.

Operation 202: Receive first targeting information for the video promotion content material and second targeting information for the audio material that are set by the promotion client.

Herein, the first targeting information may be the same as or different from the second targeting information. In some examples, the second targeting information may be a subset of the first targeting information. In some examples, the second targeting information further includes a push frequency limit of the audio material, for example, the push frequency limit of the audio material to an application client of user A is 3 times.

Herein, in order to achieve a better promotion content delivery effect, different users may see the same picture but hear different sounds for the same video promotion content, and the promotion party does not need to upload a plurality of video promotion content materials through the promotion client to provide the different sounds of the video promotion content but only needs to upload one image material and a plurality audio materials, thereby reducing the production costs of the materials.

Operation 203: Generate an order of a promotion content (e.g., a promotion content material) according to the video promotion content material, the first targeting information, and the second targeting information.

In some examples, after the order of the promotion content is generated, the order is checked. In a case that at least one of the first targeting information or the second targeting information is inaccurate, a result of checking on the order is determined to be a failure, and a check result is fed back to the promotion client.

Herein, that at least one of the first targeting information and the second targeting information is inaccurate includes determining whether the first targeting information set by the promotion client corresponds to a type (or a category) of the video promotion content. For example, in a case that the first targeting information related to tourism information, the promotion content delivery platform 103 checks at least one of whether the type of the video promotion content is the tourism information, whether the second targeting information corresponds to a content type of the audio material, and whether the first targeting information corresponds to the second targeting information, for example, whether the second targeting information is a subset of the first targeting information. For example, in a case that an order target (that is, the first targeting information) set by the promotion client indicates a female, the promotion content delivery platform 103 checks whether the second targeting information is a subset (e.g., a female in Shanghai) of the first targeting information (or the second targeting information indicates a female, which is the same as in the first targeting information). In a case that the second targeting information indicates a female or a female that resides in Shanghai, the promotion content delivery platform 103 determines that a result of checking on the order is successful.

In some examples, the promotion content delivery platform 103 further checks a format and content of the video promotion content material. In a case that the promotion content material meets requirements, the promotion content delivery platform 103 places the promotion content material in a material library for storage. In a case that the video promotion content material does not meet the requirements, the promotion content delivery platform 103 feeds back a check result to the promotion client or notify the promotion client. The promotion client may choose to re-upload the video promotion content material.

Operation 204: Determine a to-be-pushed order according to a video promotion content push request carrying a user identity sent by an application client, the first targeting information and the second targeting information in the order matching the user identity.

In some examples, the video promotion content push request includes information (such as a video format, video definition, and other parameters) about a currently displayed video (such as a movie played by a video APP) and a user identity. The promotion content delivery platform 103 performs selection from a menu according to the currently displayed video information and the user identity to determine the to-be-pushed order, and sends data of the order to the application client. The data of the order includes at least a to-be-pushed URL of the image material and a to-be-pushed URL of the audio material.

In some examples, the determining a to-be-pushed order according to a video promotion content push request carrying a user identity sent by the application client includes: selecting the to-be-pushed order from an order set of the video promotion content according to the user identity carried in the push request. A candidate order set is selected according to a matching degree between the first targeting information of each order in the order set and the user identity. The to-be-pushed order is selected from the candidate order set according to the matching degree between the second targeting information in the candidate order in the candidate order set and the user identity.

In some examples, the second targeting information includes a push frequency limit of the audio material. That the to-be-pushed order is selected from the candidate order set according to the matching degree between the second targeting information in the candidate order in the candidate order set and the user identity includes: in a case that a matching degree between one piece of the second targeting information in one candidate order and the user identity reaches a set condition, a number of times the audio material corresponding to the second targeting information in the candidate order is pushed within a period; and in a case that the number of times the audio material corresponding to the second targeting information in the candidate order is pushed does not exceed the push frequency limit, the candidate order is used as the to-be-pushed order, and an audio material corresponding to the second targeting information is used as the to-be-pushed audio material. The data that is of the order and that is sent to the application client includes a link address of the to-be-pushed audio material.

For example, in a case that the promotion content is an advertisement, the order set is {order 1, order 2, order 3, order 4, order 5, order 6}, first targeting information of a video advertisement material in order 1, order 3, and order 5 is female, first targeting information of a video advertisement material in order 2, order 4, and order 6 is male. In a case that an advertisement SDK in an application client of a Shanghai female user sends an advertisement request to the promotion content delivery platform 103, the promotion content delivery platform 103 determines, according to a user identity carried in the advertisement request, that the order 1, order 3 and order 5 are candidate orders and the candidate order set is {order 1, order 3, order 5}.

Herein, the promotion content delivery platform 103 may automatically capture (or obtain) feature data (or a user portrait or a user attribute) of the user according to the user identity, such as a gender, an age, a region, and a preference, etc. of the user, and match the feature data of the user with the first targeting information. Herein, first targeting information of order 1, order 3, and order 5 is matched with the feature data (such as the gender and region) of the user, so that the candidate order set may be matched with the first targeting information. In the promotion content delivery platform 103, a user data management system performs data mining on network access behavior data, user registration data, and service data that is of each user and that is collected from the network, so as to obtain a user portrait of each user. The user portrait may represent a basic personal attribute and an interest attribute, etc. of a user. A user portrait of a user may be a feature tag set, such as {female, Shanghai, young, pet, Korean drama}. The feature tag set may be expressed by a feature vector including a plurality of dimensions. Each dimension represents one feature tag. A value in one dimension represents a matching degree between the user and the feature tag corresponding to the dimension.

In a case that the second targeting information of the audio material in order 1 is a Shanghai female, the second targeting information of the audio material in order 3 is a Beijing female, and the second targeting information of the audio material in order 5 is a Guangzhou female, the promotion content delivery platform 103 determines that order 1 is a to-be-pushed order according to the user identity and the second targeting information of the audio material.

Herein, for example, with respect to targeting based on the first targeting information, the first targeting information may further include geographic targeting and age targeting, etc. In a case that the first targeting information includes a plurality of targeting categories, a matching degree between the first targeting information and the user identity may be 65%, 70%, or 80% among the candidate order set. The promotion content delivery platform 103 determines the to-be-pushed order according to a matching degree between the second targeting information in each candidate order in the candidate order set {order 1, order 3, order 5} and the user identity. For example, based on a matching degree corresponding to order 1 of 80%, a matching degree corresponding to order 3 of 70%, a matching degree corresponding to order 5 of 65%, and a set condition of 75% of a matching degree between the second targeting information in a candidate order and the user identity, only the matching degree between the second targeting information of order 1 and the user identity reaches the set conditions. Accordingly, the promotion content delivery platform 103 determines that order 1 is the to-be-pushed order. Similarly, for example, the second targeting information may include the geographic targeting and the gender targeting, and the second targeting information may further include content targeting (for example, the audio material content is a tourism type), and age targeting, etc. The matching degree between the second targeting information and the user identity may also be 65%, 70%, or 80% among the caudate order set.

In some examples, the second targeting information further includes a push frequency limit of the audio material. In a case that the matching degree between a piece of the second targeting information of the candidate order 1 and the user identity reaches the set condition, the promotion content delivery platform 103 may search for a number of times the audio material in the candidate order 1 is pushed within a period of time. In a case that the number of times the audio material is pushed does not exceed the push frequency limit, the candidate order 1 is used as the to-be-pushed order, and the audio material corresponding to the second targeting information is used as a to-be-pushed audio material. Data that is of the order 1 and that is sent to the application client 101 includes a link address of the to-be-pushed audio material.

In some examples, in a case that there is only one audio material for which the matching degree between the second targeting information of the audio material and the user identity in the to-be-pushed order reaches the set condition, the promotion content delivery platform 103 may determine the audio material as the to-be-pushed audio material.

For example, in a case that it is determined that order 1 is the to-be-pushed order, and order 1 includes one image material and three audio materials associated with the image material, for example, an audio material A, an audio material B, and an audio material C, each audio material corresponds to a piece of second targeting information. For example, the second targeting information of the audio material A is a Shanghai female, age 20-30, the second targeting information of the audio material B is the Shanghai female, age 30-40, and the second targeting information of the audio material C is the Shanghai female, age 40-50. As described above, the feature data of the user may be automatically captured by the promotion content delivery platform 103 based on the user identity. In a case that an advertisement SDK in the application client of a user who is the Shanghai female and aged 25 sends an advertisement request to the promotion content delivery platform 103, the promotion content delivery platform 103 determines the matching degree between the second targeting information of each audio material and the user identity in response to the request, and determines the to-be-pushed audio material according to the matching degree. Herein, only the audio material A matches the user identity herein, and therefore the audio material A is determined as the to-be-pushed audio material.

In some examples, in a case that there are a plurality of audio materials for which the matching degrees between the second targeting information of the plurality of audio materials and the user identity in the to-be-pushed order reach the set condition, the promotion content delivery platform 103 may (optionally) select one of the plurality of audio materials and determine the one of the audio materials as the to-be-pushed audio material. In some examples, the promotion content delivery platform 103 may determine the plurality of audio materials corresponding to the matching degrees that reach the set condition as the to-be-pushed audio materials.

For example, in a case that it is determined that order 1 is the to-be-pushed order, and order 1 includes one image material and three audio materials associated with the image material, for example, an audio material A, an audio material B, and an audio material C, each audio material corresponds to a piece of second targeting information. For example, the second targeting information of the audio material A corresponds to a Shanghai female, age 20-30, the second targeting information of the audio material B corresponds to the Shanghai female, age 20-30, and the second targeting information of the audio material C corresponds to the Shanghai female, age 40-50. In a case that the advertisement SDK in the application client of a user who is the Shanghai female and aged 25 sends an advertisement request to the promotion content delivery platform 103, the promotion content delivery platform 103 obtains, through search, in response to the request, that both the second targeting information of the audio material A and the second targeting information of the audio material B match the user identity (or the matching degree corresponding to the audio material A and the matching degree corresponding to the audio material A reach the set condition). One of the audio material A and the audio material B is optionally selected and determined as a to-be-pushed audio material. In some examples, the promotion content delivery platform 103 may determine both the audio material A and the audio material B as the to-be-pushed audio materials.

In some examples, in a case that the second targeting information includes a predetermined push frequency of the audio material, there are a plurality pieces of the second targeting information whose matching degree reaches a set condition, for example, an audio material A, an audio material B and an audio material C. In a case that the number of times the audio material A is pushed reaches the push frequency limit, the promotion content delivery platform 103 stops pushing the audio material A; and selects, as the to-be-pushed audio material, one of the audio material B and the audio material C.

Operation 205: Transmit data of the order to the application client, so that the application client displays the video promotion content, the data of the order including a link address of a to-be-pushed image material and a link address of an audio material for which the second targeting information matching the user identity is set.

Herein, the promotion content delivery platform 103 further includes a content storage server for storing the image material and the audio material. The image material and the audio material are disposed separately. Therefore, a URL of the image material is different from a URL of the audio material, so that the application client 101 may separately acquire the audio material, avoiding repeated acquisition of the same image material, thereby reducing the bandwidth costs of material transmission.

In the foregoing technical solution, the same video material (or the same image material) and different audio materials for the same video promotion content may be sent to application clients of different users, so that different users see the same image and hear different audios, to further improve a delivery effect of the video promotion content.

Figure 3:
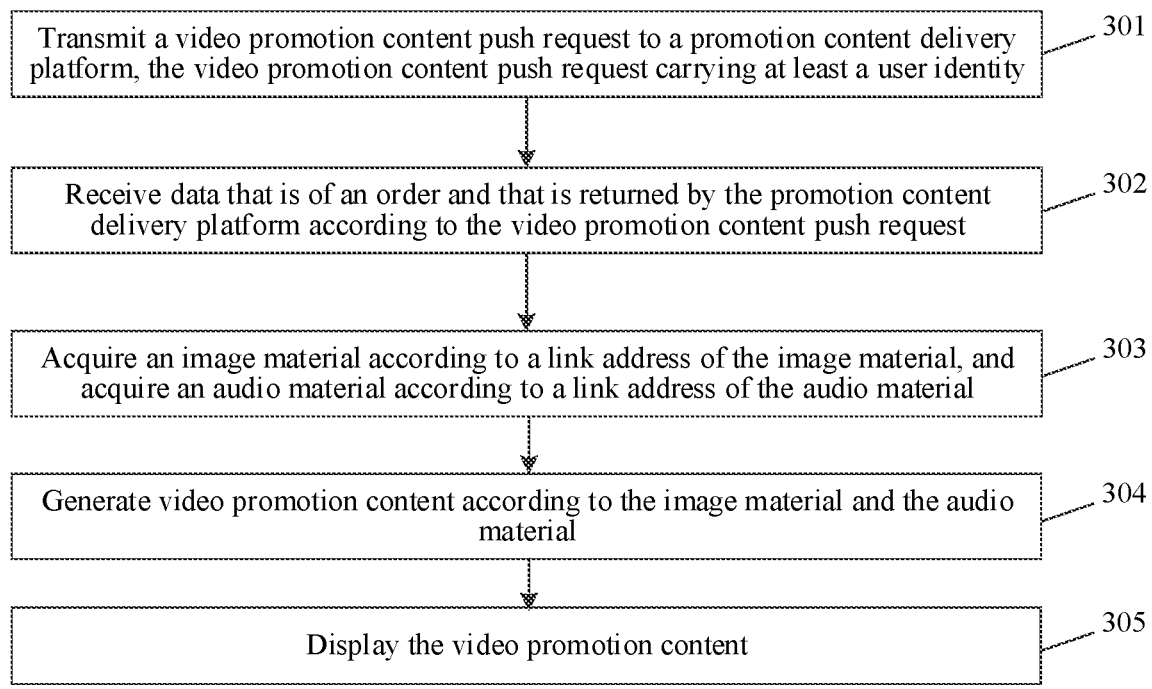
FIG. 3 is a flow chart of a method according to another example embodiment of the disclosure.

In some examples, the disclosure further provides a promotion content push method applied to an application client 101. As shown in FIG. 3, the method includes the following operations:

Operation 301: Transmit a video promotion content push request to a promotion content delivery platform, the video promotion content push request carrying at least a user identity.

Herein, for example, a user opens a page of the application client 101, and the page includes a promotion content. For example, the user opens a social circle of a WeChat application, and a video information stream advertisement is included in a friend's update of the social circle. In another example, the user opens an application client 101 such as a video APP for watching an online video (e.g., a movie), and the video includes an advertisement such as a pre-roll pre-movie advertisement, a mid-roll pre-movie advertisement, or a post-roll pre-movie advertisement. In the foregoing case(s), all advertisement SDKs in the application client 101 sends a video promotion content push request to the promotion content delivery platform 103.

Operation 302: Receive information about the video promotion content material returned by the promotion content delivery platform according to the video promotion content push request, the information about the video promotion content material including a link address of an image material and a link address of an audio material, the video promotion content material corresponding to first targeting information, and the audio material corresponding to second targeting information, both the first targeting information and the second targeting information matching the user identity.

Operation 303: Acquire the image material according to the link address of the image material, and acquire the audio material according to the link address of the audio material.

In some examples, the acquiring the image material according to the link address of the image material, and acquiring the audio material according to the link address of the audio material includes: in a case that it is determined that the audio material corresponding to the link address of the audio material is cached locally, the audio material corresponding to the link address of the audio material is read locally; in a case that it is determined that the image material corresponding to the link address of the image material is cached locally, the image material corresponding to the link address of the image material is read locally; in a case that it is determined that the audio material corresponding to the link address of the audio material is not cached locally, the audio material is acquired from a corresponding content storage server according to the link address of the audio material and is cached locally; and in a case that it is determined that the image material corresponding to the link address of the image material is not cached locally, the image material is acquired from a corresponding content storage server according to the link address of the image material and is cached locally.

In some examples, the method further includes: the locally cached image material and audio material are deleted in a case that display of the video promotion content is completed.

For example, in a case that an order includes an image material and a plurality of audio materials associated with the image material, such as an audio material A and an audio material B, and the second targeting information of the audio material A and the audio material B both match a user identity, one or more of the audio material A and the audio material B may be selected to be included in the to-be-pushed order. In a case that the application client 101 of the user receives data of the order and acquires the image material from the content storage server according to a URL of the image material and the audio material A according to a URL of the audio material A, the application client 101 locally caches the image material and the audio material A, and correspondingly saves an identifier of the image material and an identifier of the order to obtain a file name of the image material, such as an order ID-image material, and correspondingly saves an identifier of the audio material A and an identifier of the order to obtain a file name of the audio material A, such as an order ID-audio material A.

In a case that the application client 101 receives data that is of the order and that includes the URL of the image material and the URL of the audio material A, the application client 101 first determines, according to the file name of the image material, that the image material is locally cached to obtain a local storage path of the image material, for example, /xx/xx/material folder/order ID-image material, and acquires the image material according to the storage path; and determines, according to the file name of the audio material A, that the audio material is cached locally and acquires the audio material A according to the local storage path of the audio material A. Accordingly, the image material and the audio material A are not acquired from the content storage server, thereby reducing bandwidth costs of material transmission.

In a case that the application client 101 receives data that is of an order and that includes the URL of the image material and the URL of the audio material B, the application client 101 first determines, according to the file name of the image material, that the image material is cached locally to obtain a local storage path of the image material, and acquires the image material according to the storage path; and determines, according to the file name of the audio material B, that the audio material B is not cached locally, the application client 101 acquires the audio material B from a corresponding content storage server according to the link address of the audio material B and caches the audio material locally. In this way, for a video promotion content, the application client 101 only needs to acquire the audio material B of the video promotion content from the corresponding content storage server, greatly reducing the bandwidth costs of material transmission compared to simultaneous acquisition of the image material and the audio material.

In a case that display of the video promotion content including the image material, the audio material A, and the audio material B is completed (for example, an advertisement delivery period is completed), the application client 101 deletes the locally cached image material, audio material A, and audio material B, to further provide more storage space and improve an operating performance of the application client.

Operation 304: Generate a video promotion content according to the image material and the audio material.

Herein, the application client 101 combines the image material with the audio material to generate the video promotion content.

In some examples, in a case that information about the video promotion content material includes a link address of an image material and link addresses of a plurality of audio materials, and second targeting information corresponding to the plurality of audio materials match a user identity, the application client 101 acquires the image material and the plurality of audio materials according to the link address of the one image material and the link addresses of the plurality of audio materials, and combines the image material with the plurality of audio materials to generate the video promotion content.

Operation 305: Display the video promotion content.

In some examples, in a case that the video promotion content includes one image material and a plurality of audio materials, the application client 101 provides a selection control in response to a selection by the user of any one of the audio materials and display of the video generation content generated by the audio material and the image material through combination. In other words, the application client 101 may display only the video promotion content generated based on one audio material and one image material.

Figure 4:
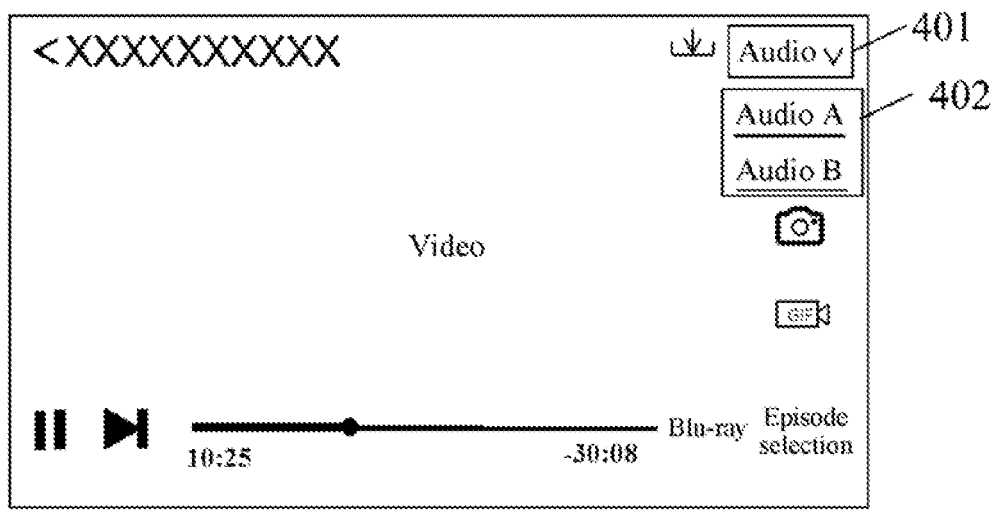
FIG. 4 is a diagram of a user interface according to an example embodiment of the disclosure.

As shown in FIG. 4, the application client 101 is a video APP and displays a video, and an audio selection control 401 is provided on a playback interface of the video APP. In a case that a user operates a pull-down button in the control 401, a plurality of audio options are provided as shown in 402. In a case that the user selects any one of audios (such as audio B), the video APP plays the audio (e.g., the audio B), or switches a currently played audio to the selected audio. For example, when the currently played audio is audio A, in a case that the user selects the audio B through the control 401 and the control 402, the video APP switches the audio A to the audio B to be reproduced.

In the foregoing technical solution, different users may view the same image but hear different audios for a same video promotion content, to achieve accurate delivery of the video promotion content that matches with the feature data of the user and improve a display effect of the application client.

Figure 5:
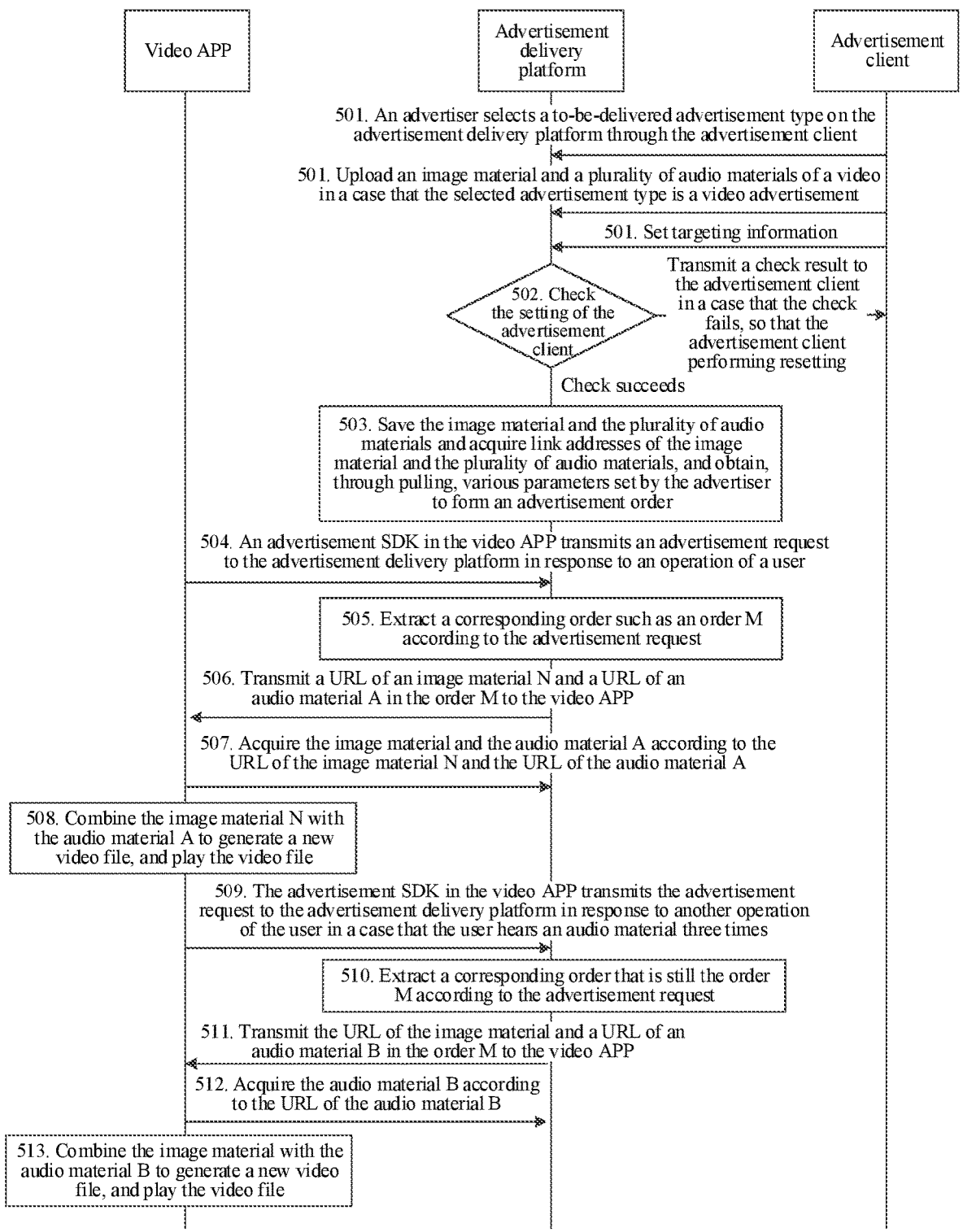
FIG. 5 is a diagram of a message interaction for pushing a promotion content according to an example embodiment of the disclosure.

A video promotion content push method according to the disclosure is described in detail below with reference to an example embodiment of an advertisement push. FIG. 5 shows a diagram of a message interaction of an advertisement push according to an example embodiment of the disclosure. In this example, an advertisement delivery platform corresponds to the foregoing promotion content delivery platform and may further include a content storage server. A video APP corresponds to the foregoing application client, and the video APP may further include a play module, a picture acquiring module, a sound acquiring module, a combining module, and an advertisement SDK. A video server corresponds to the foregoing application server. An advertisement client corresponds to foregoing promotion client. As shown in FIG. 5, an advertisement push process includes the following operations 501-513:

Operation 501: In a case that an advertiser intends to publish an advertisement and create an order on the advertisement delivery platform through the advertisement client, the advertiser may upload an advertisement material and set various parameters of the advertisement order by accessing a page provided by the advertisement delivery platform, including: selecting an advertisement position (or a promotion type), such as an image advertisement, an audio advertisement, a video advertisement including an image and an audio, etc., and may further set an advertisement delivery goal, such as a scheduled amount of play (or a scheduled amount of exposure), a budget, and user targeting (e.g., targeted user profile), etc., and uploading the advertisement material to the advertisement delivery platform through the advertisement client.

In a case that the advertiser selects a video advertisement type including an image and an audio (such as a pre-roll pre-video advertisement, a video focus image, and a video stream advertisement, etc.) through the advertisement client, the advertisement client splits the advertisement material into an image material and an audio material, and a plurality of associated audio materials are configured for one image material and uploaded to the advertisement delivery platform. In this case, user targeting information (e.g., the second targeting information) of the audio material includes setting the different audio materials to correspond to different users (for example, a user A corresponds to an audio material A, a user B corresponds to an audio material B, and the user A corresponds to both the audio material A and the audio material B, etc.), and the audio material corresponds to a push frequency limit (that is, a maximum number of times the advertisement delivery platform pushes audio material A to the video APP of user A) of the video APP of the user, etc.

For example, an order M includes a link address (URL) of an image material N, a URL of an audio material A, and a URL of audio material B, and the audio material A and the audio material B are different audio materials associated with the image material N. An identity of the user A matches user targeting (e.g., first targeting information) of the order M and matches both user targeting (e.g., the second targeting information) of the audio material A and user targeting (second targeting information) of the audio material B, and a push frequency limit of the audio material A corresponding to the video APP of the user A is three.

Operation 502: The advertisement delivery platform checks a format and content of an advertisement material uploaded by the advertiser, checks various parameters set by the advertiser; if the check result is successful (e.g., the format, content, and parameters of the advertisement are appropriate), operation 503 is continuously performed, or otherwise a check result is fed back to the advertisement client, or the process returns to operation 501 in which the advertisement client may re-upload the advertisement material. In an example embodiment, in a case that at least one of the first targeting information or the second targeting information is determined to be inconsistent with the advertisement material, the check is determined to have failed, and a check result is fed back to the advertisement client.

Operation 503: The advertisement delivery platform saves the image material N and the plurality of audio materials (e.g., audio material A and audio material B) and acquires link addresses of the image material and the plurality of audio materials, and obtains, through pulling, various parameters set by the advertiser to form an advertisement order. Herein, each advertisement order has an order ID, and describes information such as an advertisement position, a delivery goal, a URL of the image material N, and a URL of the audio material. Herein, the advertisement delivery platform may maintain a material library, and may keep a video material (or an image material) in the material library.

Operation 504: An advertisement SDK in a video APP sends an advertisement request to the advertisement delivery platform in response to an operation of a user. For example, user A clicks a URL of a first episode of a TV series in the video APP, and the advertisement request carrying at least information of the first episode of the TV series (such as a name of the first episode of the TV series) and a user ID is transmitted to the advertisement delivery platform.

Operation 505: The advertisement delivery platform extracts a corresponding order, for example, an order M, according to the advertisement request.

Operation 506: The advertisement delivery platform sends data of the order M to the video APP. Herein, the data of the order M includes the URL of the image material N and the URL of the audio material A (e.g., the advertisement delivery platform selects the audio material A from the audio material A and the audio material B).

Operation 507: The picture acquiring module of the video APP acquires the image material N from a content storage server in the advertisement delivery platform according to the URL of the image material N, and the sound acquiring module acquires the audio material A from the content storage server according to the URL of the audio material A.

Operation 508: The combining module in the video APP combines the image material N with the audio material A to generate an advertisement video file, and sends the advertisement video file to a playback module that plays the advertisement video file.

Operation 509: In a case that the user A hears the audio material A for three times (that is, a number of times the audio material A is pushed reaches the push frequency limit, for example, the user A has watched three episodes of the TV series, and a pre-roll advertisement before each episode being a combination of the same image material and the audio material A), the advertisement SDK in the video APP sends an advertisement request to the advertisement delivery platform in response to a re-operation of the user A, for example, the user clicks a link address of a fourth episode of the TV series in the video APP, the advertisement request carrying at least information about the fourth episode of the TV series and the user ID.

Operation 510: It is assumed that the advertisement delivery platform extracts that the corresponding order is still the order M according to the advertisement request, because a number of times the audio material A is pushed reaches the push frequency limit, the advertisement delivery platform stops pushing, to the application client corresponding to the user A, the audio material A, and pushes the URL of the audio material B and the URL of the image material N in the order to the application client of the user A.

Operation 511: The advertisement delivery platform sends the URL of the image material N and the URL of the audio material B in data of the order M to the video APP.

Operation 512: The sound acquiring module acquires the audio material B from the content storage server according to the URL of the audio material B. The image acquiring module no longer acquires the image material from the content storage server, because the image acquiring module in the video APP has acquired the image material, for example, the image material is cached locally, thereby greatly reducing the bandwidth costs of material transmission.

Operation 513: The combining module in the video APP combines the image material N and the audio material B to generate an advertisement video file, and sends the advertisement video file to the playback module that plays the advertisement video file.

Figure 6:
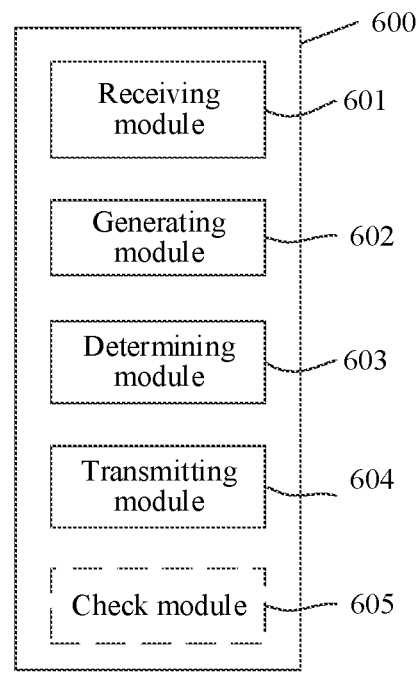
FIG. 6 is a structural diagram of an apparatus according to an example embodiment of the disclosure.

Based on the method in the foregoing example, an example embodiment of the disclosure further provides a promotion content push apparatus 600, as shown in FIG. 6, including:

a receiving module 601 configured to receive a video promotion content material uploaded by a promotion client, the video promotion content material including an image material and an audio material; and receive first targeting information for the video promotion content material and second targeting information for the audio material that are set by the promotion client;

a generating module 602 configured to generate an order of a promotion content according to the video promotion content material, the first targeting information, and the second targeting information;

a determining module 603 configured to determine a to-be-pushed order according to a video promotion content push request transmitted from an application client, both the first targeting information and the second targeting information in the to-be-pushed order matching a user identity (e.g., first targeting information related to a video promotion content material of the to-be-pushed order and second targeting information related to an audio material of the to-be-pushed order matching the user identity); and a transmitting module 604 configured to transmit data of the order to the application client, so that the application client displays the video promotion content, the data of the order including a link address of a to-be-pushed image material and a link address of a to-be-pushed audio material.

In some examples, the apparatus further includes a check module 605 configured to check, after the order of the promotion content is generated, the order; and in a case that at least one of the first targeting information and the second targeting information is inaccurate, determine that the check on the order fails and feed a check result back to the promotion client.

Figure 7:
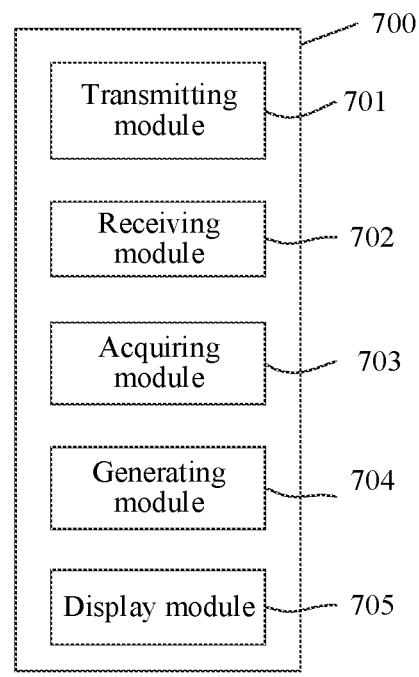
FIG. 7 is a structural diagram of an apparatus according to another example embodiment of the disclosure.

In some examples, an example embodiment of the disclosure further provides a promotion content push apparatus 700, as shown in FIG. 7, including:

a transmitting module 701 configured to transmit a video promotion content push request to a promotion content delivery platform, the video promotion content push request carrying at least a user identity;

a receiving module 702 configured to receive information about a video promotion content material returned by the promotion content delivery platform according to the video promotion content push request, the information about the video promotion content material including a link address of an image material and a link address of an audio material, the video promotion content material corresponding to first targeting information, and the audio material corresponding to second targeting information, the first targeting information and the second targeting information matching the user identity;

an acquiring module 703 configured to acquire the image material according to the link address of the image material, and acquire the audio material according to the link address of the audio material;

a generating module 704 configured to generate a video promotion content according to the image material and the audio material; and a display module 705 configured to display the video promotion content.

In an example embodiment, the promotion content push apparatus may run in various computing devices that may process user information based on the Internet, and load the processed user information in a memory of the computing device.

Figure 8:
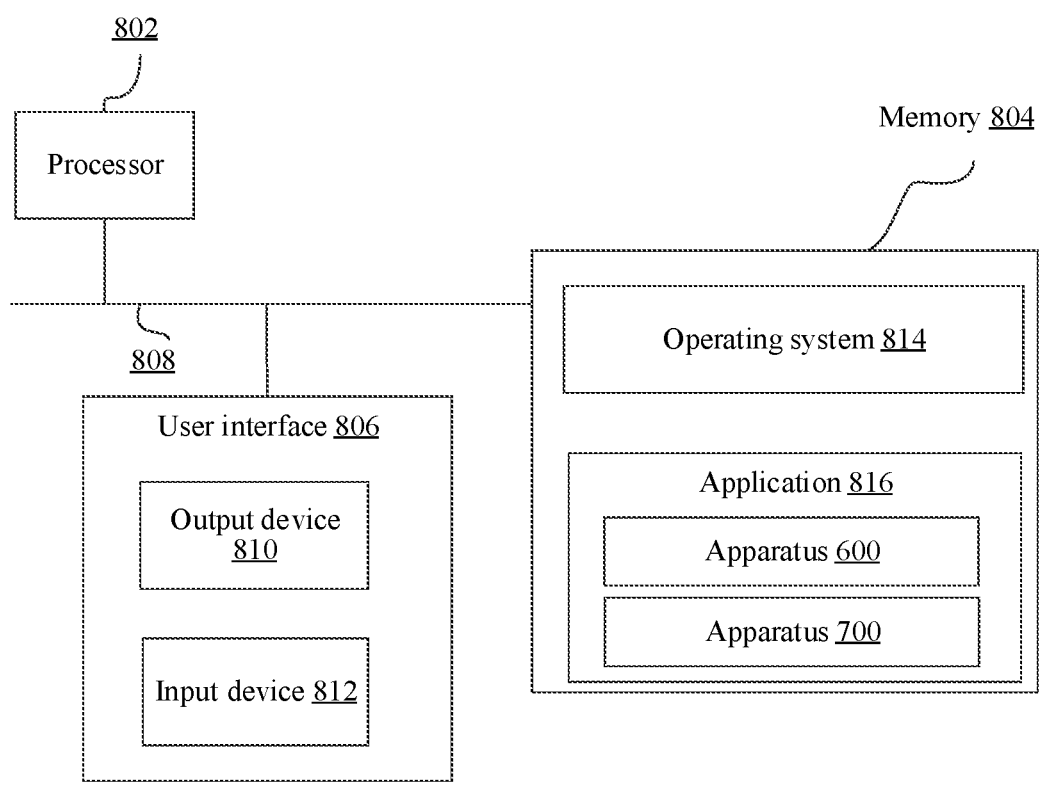
FIG. 8 is a structural diagram of a device according to an example embodiment of the disclosure.

FIG. 8 shows a structural diagram of a composition of a computing device in which a promotion content push device is located. As shown in FIG. 8, the computing device includes one or more processors (e.g., central processing unit (CPU)) 802, a memory 804, a user interface 806, and a communication bus 808 configured to interconnect components of the computing device.

The user interface 806 includes one or more output devices 810 that includes one or more speakers and/or one or more displays. The user interface 806 further includes one or more input devices 812, including, for example, a keyboard, a mouse, a voice command input unit or microphone, a touch screen display, a touch-sensitive input pad, a gesture capture camera, or other input buttons or controls. The above examples are given for illustrative purposes only and the output device 810 and the input device 812 are not limited thereto.

The memory 804 may be a high-speed random access memory such as a DRAM, SRAM, DDR RAM, or other random access solid-state storage devices; or a non-volatile memory such as one or more magnetic disk storage devices, optical disk storage devices, flash memory devices or other non-volatile solid-state storage devices.

The memory 804 stores a set of instructions executable by the processor 802. The memory includes:

an operating system 814 including programs for handling various basic system services and for performing hardware-related tasks; and an application 816 including various application programs for pushing promotion content. Such application programs may implement a processing flow in any one of the foregoing examples, and may include, for example, the apparatus 600 shown in FIG. 6 and/or the apparatus 700 shown in FIG. 7.

In some examples, the apparatus 600 may include various modules 601-605 shown in FIG. 6. The modules 601-605 may store machine executable instructions. The processor 802 may implement functions of the modules 601-605 by executing the machine executable instructions of the modules 601-605 in the memory 804.

In some examples, the apparatus 700 may include various modules 701-705 shown in FIG. 7. The modules 701-705 may store the machine executable instructions. The processor 802 may implement functions of the modules 701-705 by executing the machine executable instructions of the modules 701-705 in the memory 804.

Not all of operations and modules in the procedures and the structural diagrams described above are necessary, and some operations or modules may be omitted depending on embodiments. An execution sequence of the operations is not fixed and may be adjusted as needed. Division of the modules is merely functional division for ease of descriptions. In an actual implementation of an example embodiment of the disclosure, one module may include a plurality of modules, and functions of a plurality of modules may be implemented by a same module. These modules may be located in a same device or in different devices.

The hardware modules in the example embodiments may be implemented in a hardware manner or by using a hardware platform plus software. The software includes machine-readable instructions, stored in a non-volatile storage medium. Therefore, each instance may be implemented in a form of a software product. For example, corresponding to the foregoing promotion content push method and apparatus, an example of the disclosure further provides a computer-readable storage medium, storing a computer instruction, the computer instruction, when executed by a processor, implementing the operations of the foregoing promotion content push method.

In the example embodiments, the hardware may be implemented by dedicated hardware or hardware executing the machine-readable instructions. For example, the hardware may be a permanent circuit or logical device (for example, a special-purpose processor, such as a Field Programmable Gate Array (FPGA) or an Application Specific Integrated Circuit (ASIC) that is specially designed to perform particular operations. Alternatively, the hardware may include a programmable logic device or circuit (for example, including a general-purpose processor or another programmable processor) that is temporarily configured by software to perform particular operations.

In addition, each example embodiment of the disclosure may be implemented by a data processing program executed by a data processing device such as a computer. Apparently, the data processing program constitutes the disclosure. In addition, generally, a data processing program stored in a storage medium is directly read from the storage medium for execution or the program is installed on or replicated to a storage device (such as a hard disk or memory) of a data processing device for execution. Therefore, such storage medium also constitutes the disclosure. The disclosure further provides a non-transitory, non-volatile storage medium storing a data processing program. The data processing program may be used for performing any one of the foregoing embodiments of the disclosure.

The machine-readable instruction(s) corresponding to a module described in FIG. 6 and/or FIG. 7 may enable an operating system and the like operated on a computer to complete some or all operations described herein. A non-transitory, non-volatile computer-readable storage medium may be a memory disposed in an extension board inserted into the computer or a memory disposed in an extension unit connected to the computer. A CPU and the like installed on the extension board or the extension unit may perform some or all actual operations according to the instructions. An example of the computer readable storage medium includes magnetic media such as hard disks, floppy disks and magnetic tape, optical media such as CD-ROMs, DVDs, magneto-optical media, such as floptical disks, and hardware devices specifically configured to store and execute program instructions such as ROMs, RAMs, flash memories, or the like.

In addition, apparatuses and modules in the example embodiments of the disclosure may be integrated into one processing unit, or each of the modules may exist alone physically, or two or more apparatus or modules may be integrated into one unit. The integrated unit may be implemented in a form of hardware, or may be implemented in a form of a software functional unit.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A promotion content push method, performed by a promotion content delivery platform, the method comprising:
receiving a video promotion content material uploaded by a promotion client, the video promotion content material comprising an image material and an audio material, the audio material comprising a plurality of audio materials associated with the image material;
receiving, from the promotion client, first targeting information related to the video promotion content material and second targeting information related to the audio material, the second targeting information comprising a plurality of pieces of second targeting information respectively corresponding to the plurality of audio materials;
generating an order of a promotion content according to the video promotion content material, the first targeting information, and the second targeting information;
in response to a video promotion content push request, including a user identity, transmitted from an application client, determining a to-be-pushed order of the promotion content, first targeting information related to a video promotion content material of the to-be-pushed order and second targeting information related to an audio material, among the plurality of audio materials, of the to-be-pushed order matching the user identity; and
transmitting data of the to-be-pushed order to the application client, the data of the to-be-pushed order comprising a link address of a to-be-pushed image material and a link address of the audio material of the to-be-pushed order,
wherein the determining the to-be-pushed order comprises:
selecting a set of candidate orders based on a matching degree between first targeting information of each candidate order in the set of candidate orders and the user identity; and
selecting the to-be-pushed order from the set of candidate orders based on a matching degree between second targeting information of each candidate order in the set of candidate orders and the user identity.

2. The promotion content push method according to claim 1, wherein the receiving the video promotion content material comprises:
receiving, from the promotion client, the video promotion content material and a promotion target parameter, the promotion target parameter indicating that a type of a promotion content based on the video promotion content material being a video.

3. The promotion content push method according to claim 1, further comprising:
checking the generated order of the promotion content; and
based on at least one of the first targeting information and the second targeting information being inaccurate with respect to the video promotion content material, determining that a result of the checking is a failure and providing the result of the checking to the promotion client.

4. The promotion content push method according to claim 1, wherein the second targeting information of each candidate order comprises a push frequency limit of a first audio material of each candidate order, and
wherein the selecting the to-be-pushed order from the set of candidate orders comprises:
with respect to a candidate order for which a matching degree between the second targeting information related to the first audio material of the candidate order and the user identity meets a set condition, determining a number of times the first audio material of the candidate order is pushed to a user corresponding to the user identity within a period of time; and
based on the number of times the first audio material of the candidate order is pushed to the user not exceeding the push frequency limit, determining the candidate order as the to-be-pushed order, and determining, as the audio material of the to-be-pushed order, the first audio material of the candidate order.

5. The promotion content push method according to claim 1, further comprising automatically obtaining feature data, indicating an attribute of a user, based on the user identity, and matching the feature data with the first targeting information of the to-be-pushed order.

6. The promotion content push method according to claim 5, wherein the feature data indicates the attribute of the user including at least one of a gender, an age, a region, and a preference of the user.

7. A non-transitory storage medium storing a computer readable instruction executable by at least one processor to perform the method according to claim 1.

8. A promotion content push method, performed by a terminal device that interacts with a promotion content delivery platform, wherein the promotion content delivery platform receives a video promotion content material uploaded by a promotion client, the video promotion content material comprising an image material and an audio material, the audio material comprising a plurality of audio materials associated with the image material; and receives, from the promotion client, first targeting information related to the video promotion content material and second targeting information related to the audio material, the second targeting information comprising a plurality of pieces of second targeting information respectively corresponding to the plurality of audio materials,
the method comprising:
transmitting a video promotion content push request to the promotion content delivery platform, the video promotion content push request including a user identity;
receiving information about a video promotion content material from the promotion content delivery platform in response to the video promotion content push request, the information about the video promotion content material comprising a link address of an image material and a link address of a target audio material, the video promotion content material corresponding to first targeting information, and the target audio material corresponding to second targeting information, the first targeting information and the second targeting information matching the user identity, wherein the image material and the target audio material are disposed separately in the promotion content delivery platform;

acquiring the image material based on the link address of the image material;

separately from acquiring the image material, acquiring the target audio material based on the link address of the target audio material, the link address of the target audio material being different from the link address of the image material;

generating a video promotion content based on the image material and the target audio material; and displaying the video promotion content, wherein the target audio material is determined based on selecting a set of candidate orders based on a matching degree between first targeting information of each candidate order in the set of candidate orders and the user identity; and selecting the target audio material from the set of candidate orders based on a matching degree between second targeting information of each candidate order in the set of candidate orders and the user identity.

9. The method according to claim 8, wherein the acquiring the image material and the acquiring the target audio material comprises:

locally acquiring the target audio material based on a determination that the target audio material corresponding to the link address of the target audio material is cached locally; and locally acquiring the image material based on a determination that the image material corresponding to the link address of the image material is cached locally.

10. The method according to claim 8, wherein the acquiring the image material and the acquiring the target audio material comprises:

acquiring the target audio material from a corresponding content storage server based on the link address of the target audio material and caching the target audio material locally based on a determination that the target audio material corresponding to the link address of the target audio material is not cached locally; and acquiring the image material from the corresponding content storage server based on the link address of the image material and caching the image material locally based on a determination that the image material corresponding to the link address of the image material is not cached locally.

11. The method according to claim 9, further comprising:

deleting the locally cached image material and target audio material based on completion of a display of the video promotion content.

12. A non-transitory storage medium storing a computer readable instruction executable by at least one processor to perform the method according to claim 8.

13. A promotion content push apparatus, comprising:

at least one memory configured to store program code; and at least one processor configured to read the program code and operate as instructed by the program code, the program code comprising:

receiving code configured to cause at least one of the at least one processor to:

receive a video promotion content material uploaded by a promotion client, the video promotion content material comprising an image material and an audio material, the audio material comprising a plurality of audio materials associated with the image material; and receive, from the promotion client, first targeting information related to the video promotion content material and second targeting information related to the audio material, the second targeting information comprising a plurality of pieces of second targeting information respectively corresponding to the plurality of audio materials;

generating code configured to cause at least one of the at least one processor to generate an order of a promotion content according to the video promotion content material, the first targeting information, and the second targeting information;

determining code configured to cause at least one of the at least one processor to, in response to a video promotion content push request, including a user identity, transmitted from an application client, determine a to-be-pushed order of the promotion content, first targeting information related to a video promotion content material of the to-be-pushed order and second targeting information related to an audio material, among the plurality of audio materials, of the to-be-pushed order matching the user identity; and transmitting code configured to cause at least one of the at least one processor to transmit data of the to-be-pushed order to the application client, the data of the to-be-pushed order comprising a link address of a to-be-pushed image material and a link address of the audio material of the to-be-pushed order, wherein the determining code comprises:

first selecting code configured to cause at least one of the at least one processor to select a set of candidate orders based on a matching degree between first targeting information of each candidate order in the set of candidate orders and the user identity; and second selecting code configured to cause at least one of the at least one processor to select the to-be-pushed order from the set of candidate orders based on a matching degree between second targeting information of each candidate order in the set of candidate orders and the user identity.

14. The promotion content push apparatus according to claim 13, wherein the receiving code further causes at least one of the at least one processor to receive, from the promotion client, the video promotion content material and a promotion target parameter, the promotion target parameter indicating that a type of a promotion content based on the video promotion content material being a video.

15. The promotion content push apparatus according to claim 13, wherein the program code further comprises:

checking code configured to cause at least one of the at least one processor to check the generated order of the promotion content, and based on at least one of the first targeting information and the second targeting information being inaccurate with respect to the video promotion content material, determine that a result of the checking is a failure and provide the result of the checking to the promotion client.

16. The promotion content push apparatus according to claim 13, wherein the second targeting information of each candidate order comprises a push frequency limit of a first audio material of each candidate order, and wherein the second selecting code further causes at least one of the at least one processor to:

with respect to a candidate order for which a matching degree between the second targeting information related to the first audio material of the candidate order and the user identity meets a set condition, determining a number of times the first audio material of the candidate order is pushed to a user corresponding to the user identity within a period of time; and based on the number of times the first audio material of the candidate order is pushed to the user not exceeding the push frequency limit, determine the candidate order as the to-be-pushed order, and determine, as the audio material of the to-be-pushed order, the first audio material of the candidate order.

17. The promotion content push apparatus according to claim 13, wherein the program code further comprises obtaining code configured to cause at least one of the at least one processor to automatically obtain feature data, indicating an attribute of a user, based on the user identity, and match the feature data with the first targeting information of the to-be-pushed order.

18. The promotion content push apparatus according to claim 17, wherein the feature data indicates the attribute of the user including at least one of a gender, an age, a region, and a preference of the user.

* * * * *